3,669,721
PROCESS FOR THE CONTINUOUS PRODUCTION OF COATED TUBULAR STRUCTURES
Eugen Jager, Bomlitz, Germany, assignor to Wolff Walsrode Aktiengesellschaft, Walsrode, Germany
Filed Feb. 11, 1970, Ser. No. 10,440
Claims priority, application Germany, Feb. 21, 1969, P 19 08 698.7
Int. Cl. B05b 13/06; B44d 1/10
U.S. Cl. 117—95     2 Claims

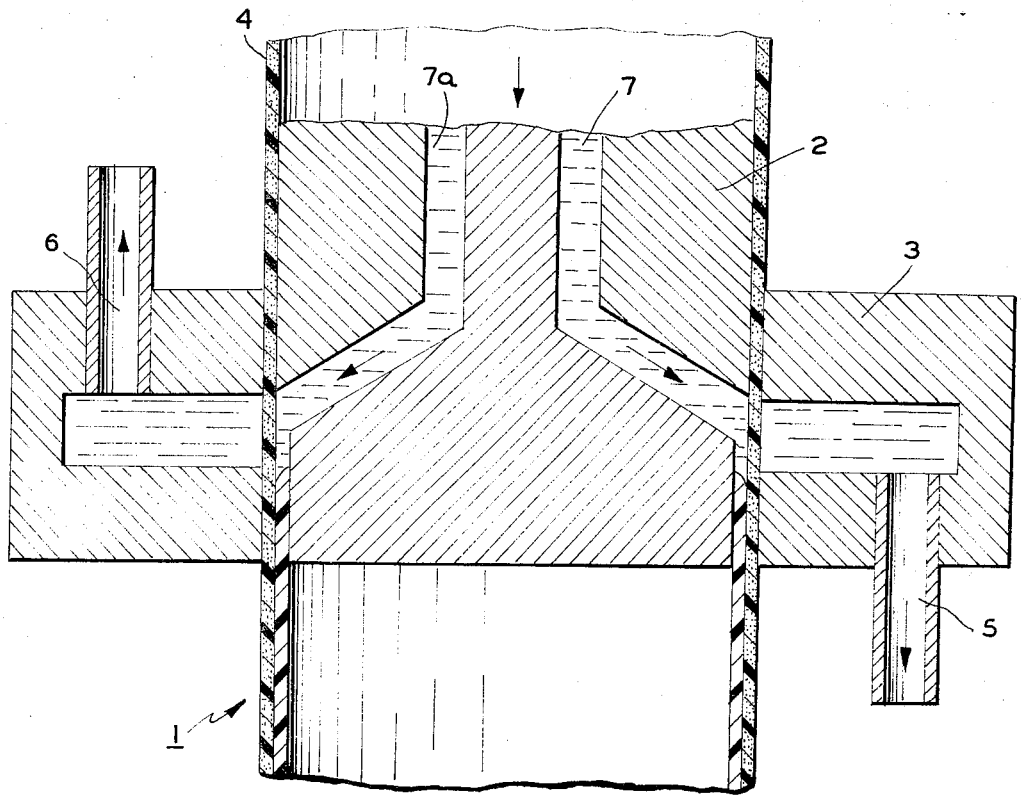

ABSTRACT OF THE DISCLOSURE

A process for the continuous production of coated tubular structures by simultaneously venting from one side and impregnating with a coating material from the other side, a tubular structure and an apparatus for carrying out the process.

PRIOR ART

The production of a tubular structure coated on both sides in the form of a sausage skin is already known inter alia from French patent specification No. 1,369,173. In this process, a long-fibre tubular structure formed from a flat sheet is coated with viscose, first on its inside and then on its outside. In this process, the first internal coating of the tubular structure also acts as an impregnation, as the viscose passes outwards through the tubular structure and forms a coherent film on its outer surface. Only then is the outside of the tubular structure coated with viscose in a separate operation. In this conventional coating process, numerous air pockets can be left behind in the supporting film. The resulting impregnation faults reduce the mechanical strength and also the transparency of the finished sausage skin. In addition, the process is complicated because the impregnating inner coating must form a coherent film over the outside of the long-fibred paper before the outer coating can be applied. Since the product is exposed to air between the first and second coatings, the inner coating of viscose that has penetrated outwards through the layer of long-fibre paper can undergo surface coagulation, resulting inter alia in a reduction in the bond strength of the subsequently applied outer viscose layer.

According to copending application Ser. No. 830,405 a process for the continuous production of artificial tubular structures coated on both sides from long-fibres or fabrics in tubular form impregnated with dissolved film formers is carried out, in which the tubular long-fibre or fabric structure formed from a flat sheet is coated with a solution of a film former in such a way that the tubular structure is vented towards the evacuation side and is impregnated with the coating material in the same direction.

In this process, the tubular structure to be coated or impregnated, having passed into an appropriate machine, is coated on one side in a first stage, and then in a second stage evacuated on that side opposite the coated side. Compared with the conventional coating processes, this procedure provides for a much quicker run throughout the material to be treated. In addition, material feed within the treatment machine is improved and film-forming impregnating solutions of a relatively high viscosity can now also be used for finishing tubular structure in a time-saving manner.

It has been found, however, that in adapting the vacuum conditions required for evacuation to the viscosity of the film-forming impregnating solutions, and more particularly in acknowledging fluctuations attributable to other causes in the rates at which the material to be impregnated passes through the system as a whole, disadvantages can arise to the extent that for example the impregnating material is sucked through the tubular structure under the vacuum subsequently applied so quickly that pores may be formed on the impregnated side.

OBJECT OF THE INVENTION

Accordingly, the object of the invention is to provide a process and an apparatus which ensure reliable sealing of the pores in the material to be impregnated, even in the borderline cases referred to above.

THE INVENTION

According to the invention, this object is achieved by a process which comprises simultaneously venting from one side and impregnating with a coating material from the other side a tubular structure. In this way, no pores can be formed even in cases where the film-forming impregnating solution is drawn in large quantities through the material to be impregnated, because further reserves of film-forming impregnating solution rather than air are present during evacuation on that side of the tubular structure to be impregnated facing the evacuation side.

Tubular structures suitable for the process of the invention are especially long-fibre paper or fabric structures.

The coating process according to the invention is not restricted to any one particular film-former, providing it can be dissolved and then solidified again from the solution. Thus, the coating agent may be a known solution of cellulose in xanthogenate (viscose), which is preferred, or of cellulose in cuprammonium (copper cellulose), although a solution of hydroxyethyl cellulose or acetyl cellulose may also be used as the coating agent. In addition to the aforementioned regenerated cellulose and cellulose derivatives, it is also possible to use corresponding known soluble and precipitable synthetic polycondensates or polymers as the film-formers.

In this connection, the film-former may optionally contain the usual stabilising or adhesion-promoting additives, providing such additives are required for finishing the skin produced in accordance with the invention, such as for example lacquering, colouring and/or printing.

The process according to the invention can be carried out irrespective of whether the tubular structure to be impregnated is treated immediately after the initial impregnation with a second layer, of the kind described, of a film-forming solution which is applied to that side facing the first coating side.

Another advantage of the process according to the invention amplified as described above is that the rate at which the materials to be treated pass through the system can be considerably increased because, since pore formation now no longer occurs, even in borderline cases, the treatment vacuum and hence the penetration rate of film-forming impregnating solution can be considerably increased.

The aforementioned embodiment according to the invention to the problem referred to previously also includes a corresponding further development and a modification of the apparatus for carrying out this process which is distinguished by the fact that the vacuum means which is accommodated in the calibrating tool on one side of the tubular structure and which is provided with an outlet for the film-former solution, is arranged level with the film-former supply means situated on the other side of the tubular structure for coating one side thereof.

The process according to the invention as described in the foregoing can advantageously be carried out with this extremely simple and substantially maintenance-free apparatus.

Naturally, it is also possible for another film-former supply means to be arranged on the side of the vacuum means and subsequent to this means to be additionally present following the aforementioned single-stage system comprising coating, impregnating and evacuating. It is of advantage for the vacuum means and for the feed and discharge means for the film formed to be in the form of annular slot chambers, the vacuum means having at least one annular slot chamber. In one particularly advantageous embodiment of the apparatus according to the invention, the first and/or the second calibrating tool consist of a transparent chemically resistant plastics material because in this way the coating or impregnation process can be continuously viewed while it is in progress.

The coating or impregnation process according to this invention is in no way dependent upon the choice of the film-former, providing it can be converted into a solution and then solidified again from the solution. Naturally, the film-former may optionally contain known stabilising or adhesion-promoting additives in this case, too.

The coating process according to the invention is illustrated by but by no means limited to the following example.

Example

A tubular structure formed in the usual way from a flat sheet of a long-fibered paper is introduced into a calibrating device consisting of a calibrating tube and a calibrating ring in which the tubular structure initially comes downward into contact with a calibrating tube or sleeve consisting of chrome nickel steel. After entering the annular gap formed by the calibrating tube and the calibrating ring, the long-fibred paper is internally coated with a standard viscose and simultaneously is vented from outside under the effect of a 50 torr vacuum and completely impregnated with the viscose which penetrates the tubular structure from inside to out. After regeneration, rinsing with water and drying performed in the known manner, the completed sausage skin coated in accordance with the invention has a high degree of transparency, the smooth inner surface of the skin making it easier to peel the sausage.

It is possible in conjunction with the variation of the amount of coating composition delivered per unit of time and the intensity of the vacuum applied to the other side, to obtain a variety of layer thicknesses on the inside and/or outside of the tubular structures. In this way, semi-mat to high-gloss products can be obtained.

The apparatus 1 according to the invention illustrated in the accompanying drawing comprises a calibrating tool 2 and a calibrating ring 3 which calibrate and guide the material 4 to be impregnated. The calibrating tool 2 accommodates supply means 7 and 7a for the film-former solution, evacuation chambers arranged opposite those on the other side of the material to be impregnated and situated in the calibrating tool 3, pipes 6 and discharge means 5 for the film-former solution.

The apparatus described above is not limited to this particular embodiment, and can be modified in different ways. Thus, it is possible for the supply means for the dissolved film-former to be arranged on the outside in the calibrating ring rather than on the inside of the material to be impregnated, whilst the evacuation means situated at the same level are arranged on the inside of the material to be treated. Similarly, it is possible for a second coating means to be arranged either above or below the material to be impregnated, depending upon the direction in which it travels, following the initial operation referred to above, so that the material can be additionally coated on that side facing the side initially coated.

What I claim is:

1. A process for the continuous treatment of a synthetic, tubular structure which comprises simultaneously applying a coating material at room temperature to one side of said tubular structure while applying sufficient vacuum to the other side to cause the coating material to impregnate the entire thickness of the tubular structure being coated.

2. The continuous process of claim 1, wherein, after the impregnation, a second coating is applied to the evacuation side.

References Cited

UNITED STATES PATENTS

| | | | |
|---|---|---|---|
| 2,767,431 | 10/1956 | Laubarede | 117—95 X |
| 3,437,537 | 4/1969 | Takada | 117—119 X |
| 3,114,301 | 12/1963 | Reifenhäuser | 117—95 X |
| 3,378,379 | 4/1968 | Shiner et al. | 117—95 X |
| 3,157,544 | 11/1964 | Lichtey | 117—95 X |

EDWARD G. WHITBY, Primary Examiner

U.S. Cl. X.R.

99—169, 176; 117—94, 119, 152, 161 C; 118—408